(12) United States Patent
Yeh

(10) Patent No.: US 6,357,896 B1
(45) Date of Patent: Mar. 19, 2002

(54) ENHANCED LAMP STRUCTURE DEVICE FOR KNOCKDOWN SHIPPING AND PROCESS FOR USING SAME

(76) Inventor: John Yeh, 18902 Patrician Dr., Villa Park, CA (US) 92861

( * ) Notice: Subject to any disclaimer, the term of this patent is extended or adjusted under 35 U.S.C. 154(b) by 0 days.

(21) Appl. No.: 09/689,448

(22) Filed: Oct. 12, 2000

(51) Int. Cl.[7] .............................................. F21V 21/06
(52) U.S. Cl. ..................................... 362/414; 362/410
(58) Field of Search .............................. 362/410, 413, 362/414, 431, 418

(56) References Cited

U.S. PATENT DOCUMENTS

| | | | |
|---|---|---|---|
| 3,858,989 A | | 1/1975 | Field |
| 4,072,432 A | | 2/1978 | Levy |
| 4,161,375 A | | 7/1979 | Murphy |
| 5,523,934 A | * | 6/1996 | Dworman et al. .......... 362/431 |
| 5,599,094 A | * | 2/1997 | Fischer et al. .............. 362/414 |
| 5,618,101 A | | 4/1997 | Yeh |
| 5,649,764 A | * | 7/1997 | Strickland .................... 362/410 |
| 5,800,054 A | * | 9/1998 | Lo et al. ...................... 362/414 |
| 6,264,350 B1 | * | 7/2001 | Swanson ..................... 362/414 |

* cited by examiner

*Primary Examiner*—Laura K. Tso
(74) *Attorney, Agent, or Firm*—Intellepharm, Inc.; Manfred E. Wolff

(57) ABSTRACT

A lamp structure device adapted for shipping in a knockdown state is disclosed, wherein a lamppost comprises at least two tubular segments longitudinally interconnected by at least one connector. The connector comprises a cylindrical male member adapted for insertion into an elongated female member. A groove and a nib are adapted to cammingly urge the male member and the female member longitudinally together upon rotation with respect to each other. Methods for use of the device in knockdown shipping, and kits containing the device and instructional materials are also taught.

17 Claims, 2 Drawing Sheets

ENHANCED LAMP STRUCTURE DEVICE FOR KNOCKDOWN SHIPPING AND PROCESS FOR USING SAME

BACKGROUND ART

A common problem in the furniture business is that many articles occupy a large volume of space, although much of that space is empty. For example a table having a top and four legs occupies a cube-like expanse of space, although much of the volume under the tabletop is empty. This characteristic causes problems in shipping and transporting furniture, because such furniture requires large shipping containers and occupies large volumes of space in transporting vehicles, resulting in high shipping costs.

A solution to this problem has been the practice of shipping furniture in a "knockdown" or "KD" state, in which the furniture is shipped partially unassembled to conserve space both in the shipping container and the transporting vehicle. For example, the table cited above could be shipped as a knocked-down shipment comprising a top and four separated legs, for later assembly. Under these circumstances, it is further required that the assembly procedure result in a robustly reassembled article that will not loosen and disassemble under normal use, and that the assembly procedure be a simple one, since it is normally carried out by the customer. Preferably, it should involve merely a simple, rapid reassembly of a few parts without the need for elaborate tools, or special skills. Particularly in the case of lamps, disassembly and reassembly should not require disconnection and reconnection of wiring, since dangerous errors in rewiring could result from the efforts of an ordinary customer without specialized electrical training. Thus, a successful knockdown article is one that can be easily and safely reassembled by the customer to form a robust unit, and one that at the same time results in a significant saving of shipping space.

Many types and configurations of floor lamps are presently in use. However, the support structures of these lamps often have features that restrict their use, particularly those floor lamps that are provided with single upright frames or posts. Such lamps are often impractical to ship due to their extreme lengths that vary from five to seven feet. Shipping containers for fully assembled floor lamps require excessive shipping room and thus transportation by ship or truck becomes very costly as a high volume of unused space is created. Accordingly, the shipper is paying for the excess unused space.

Moreover, a floor lamp in an oversize shipping container is a difficult object for a customer to transport in a standard passenger automobile. It is a common practice nowadays for customers to take purchases home in their own passenger automobiles, rather than to incur the added expense of obtaining home delivery by a delivery van.

Furthermore, any knockdown procedure or device for a floor lamp lamppost must take into account the wiring running through the lamppost. Ideally, the knockdown procedure should take advantage of a factory wired circuit, and should not require the undertaking of a wiring procedure by the end user for assembly of the lamp.

This invention relates to a novel, useful lamp structure device adapted for shipping in a knockdown state, and more particularly, to a lamppost comprising at least two tubular segments longitudinally interconnected by at least one connector. Even more particularly, the present invention comprises a novel arrangement of floor lamp structure, wherein the length of the upright post of the lamp is divided into at least two tubular segments and wherein the segments are adapted to be secured together at their ends. This knockdown construction allows a shipping container to be constructed in the standard length of approximately four feet for a floor lamp that utilizes the present invention. The lamppost sections are disassembled without disconnection of wiring when shipped and are then reassembled after reaching their destination or later after sale to the purchaser. The present invention makes possible a disassembled floor lamp package to enable a purchaser to take the lamp at the time of purchase for transportation in a passenger automobile. The present invention provides a floor lamp of knockdown character whereby the lamppost is easily assembled without the use of tools by a person of average dexterity.

Applicant believes he is familiar with commercially available connectors for tubes of polygonal cross-section, and he represents that he never has encountered a connector constructed in accordance with this invention.

By way of background, attention is called to the following. Prior patents have described various knock-down framework arrangements that utilize a connector joint or fitting to interconnect square tubes which fitting has a cubical hub from which outwardly extends from two or more faces thereof tube-receiving projections or posts. Each of the tube-receiving projections on initial assembly with a tube fits loosely within an open end of the tube in one angular position of insertion thereof, and tightly frictionally engages the inner defining walls of the tube when the tube or fitting is rotated 45 degrees from its initial position. To prevent the withdrawal of the interconnected parts from their supposed tightly fitting positions by a force tending to separate the parts longitudinally, a locking tongue is sometimes provided on each end of the tube which tongue fits into a groove formed in the associated tube-receiving projection. However, this locking tongue heretofore served the sole purpose of preventing the separation of the parts in a longitudinal direction.

In certain commercial forms of prior knock-down connectors, the tolerances utilized in the manufacture of the connector fittings and the square tubes were such that the telescoping parts thereof sometimes did not fit tightly together as desired, resulting in a weak or wobbly lamppost. Another deficiency of prior art knock-down connectors of the type described is that frequently the ends of square tubes did not fit snugly and neatly against the faces of the connector fittings, leaving unsightly openings thereat. Among other connectors on the market are those relying on a friction fit that must be forced (pounded) into an associated tube. Such connectors are subject to loosening under conditions of vibration, and are difficult to disassemble. Other prior connectors have a screw threaded in the connector which, following assembly with a tube, are backed into an accurately located opening in the tube. An example of this type of connector is disclosed in U.S. Pat. No. 3,858,989 by F. P. Field. However, this type of connector is especially unsuitable to connect lamppost segments, because it requires an opening in the tube for the screw, which spoils the appearance of the lamppost. Other connectors use clips, separate wedge members and separate resilient members for establishing connections with associated tubes.

More recent examples of efforts to avoid these limitations include the disclosure P. M. Levy in U.S. Pat. No. 4,072,432 describing a connector comprising a cubical hub having a tube-receiving portion adapted to frictionally engage surfaces of a square tube, and the disclosure of P. M. Murphy in U.S. Pat. No. 4,161,375, describing a connector comprising an elongated hollow metallic member having teeth that bite into an internal surface of a square tube. The present inventor has disclosed a floor lamp structure having an upright lamppost comprising an upper section and a lower section in U.S. Pat. No. 5,618,101, but this construction is not suited to the tubular lampposts of the present invention.

In contradistinction to all of these connectors, the present invention embraces and finally addresses the clear need for a novel, useful lamp structure device for knockdown shipping, and more particularly, to connectors for the ends of the tubes used in such lampposts. Thus, as pioneers and innovators attempt to make lamppost connectors cheaper, more universally used, and of higher quality, none has approached same in combination with simplicity and reliability of operation, until the teachings of the present invention. It is respectfully submitted that other references merely define the state of the art or show the type of systems that have been used to alternately address those issues ameliorated by the teachings of the present invention. Accordingly, further discussions of these references has been omitted at this time due to the fact that they are readily distinguishable from the instant teachings to one of skill in the art.

OBJECTS AND SUMMARY OF THE INVENTION

In light of the foregoing, it is therefore a general object of the invention to provide a connector for tubular lamppost segments intended to obviate or minimize the problems of the type previously noted.

It is a particular object of the invention to provide lampposts wherein the segments may be locked against rotational, longitudinal and transverse movement relative to one another by means of a simple and unexposed locking assembly.

Accordingly, it is an important object of the present invention to provide a floor lamp structure that can be stored in a standard shipping container of approximately four feet in a disassembled mode. The lamppost sections are disassembled without disconnection of wiring when shipped and are then reassembled after reaching their destination or later when sold to the purchaser.

It is another object of the present invention to make possible a disassembled floor lamp packaged to enable a purchaser to take the lamp at the time of purchase.

It is a further object of the present invention to provide a floor lamp of knockdown character whereby the lamppost is easily assembled without the use of tools by a person of average dexterity.

A still further object of the present invention is to provide a floor lamp of knockdown character that is simple in its structure and rugged in construction, as well as relatively inexpensive to manufacture, and yet pleasing in its design.

It is yet still a further object of the present invention to provide a connector for tubular lamppost segments of polygonal cross-section that is easy to install, and which avoids the use of screws, clips or friction fits which usually require pounding.

It is even still a further object of the invention to provide an improved knock-down lamppost of polygonal cross-section which, when the connector fittings and the segments are in their tightly fitting positions, is always fitted snugly together even when made with only modestly stringent manufacturing tolerances.

It is a yet even still a further object of the invention to provide a knock-down lamppost of the type described wherein the relative rotation of the initially loosely fitting telescoping parts into a joint locking position automatically draws the polygonal tubes involved snugly against each other, so that no unsightly gaps are visible between them and like corners of the tubular lamppost segments of polygonal cross-section are lined up.

It is yet another object of the invention to provide a knock-down lamppost as described wherein the parts thereof, even after repeated assembly and disassembly thereof, continue to form a secure, tightly fitting joint.

These and other objects are accomplished by the parts, constructions, arrangements, combinations and subcombinations comprising the present invention, the nature of which is set forth in the following general statement, and preferred embodiments of which—illustrative of the best modes in which applicant has contemplated applying the principles—are set forth in the following description and illustrated in the accompanying drawings, and are particularly and distinctly pointed out and set forth in the appended claims forming a part hereof.

The present invention is directed to a lamp structure device adapted for shipping in a knock-down state comprising in combination a lamppost comprising at least two tubular segments longitudinally interconnected by at least one connector, wherein said lamppost has a first free end and a second free end, a lamp means mounted to said first free end of said lamppost, a support base means mounted to said second free end of said lamppost; and a connector. The connector comprises a hollow cylindrical male member having a convex surface adapted for operable insertion into an elongated female member having a concave surface. The male member extends longitudinally from a predetermined end of a first predetermined said tubular segment and is attached thereto by attachment means, which may be welding, soldering, press fitting, bolting, gluing and the like. The female member is positioned within a predetermined end of a second predetermined tubular segment, and is attached thereto by attachment means. Passageways for accommodation of insulated electrical cord within the female member and the male member are coextensive with the interior of the tubular segments. At least one nib is attached to the concave surface of the female member. A single groove to slidingly receive each nib is located in the convex surface of the male member. The groove is further adapted to cammingly urge the male member and the female member longitudinally together upon rotation with respect to each other. The groove is further adapted with means to lockingly restrain the nib after the tubular members are urged together to the point of abutment.

In such a device having two nibs, the nibs may extend radially in substantially diametrically opposed fashion. The tubular segments may be of polygonal cross-section, such as triangular, square, rectangular, pentagonal, and hexagonal cross-section, and the groove and nib may be adapted to cammingly urge the male member and the female member longitudinally abutingly together upon rotation with respect to each other so that like corners of the lamppost segments of polygonal cross-section are caused to line up with each other.

A method for knock-down shipping and subsequent reassembly of a lamp structure device adapted for shipping in a knock-down state comprising in combination a lamppost comprising at least two tubular segments longitudinally interconnected by at least one connector of the type described above, comprises the steps of urging the male member and the female member longitudinally apart by rotation with respect to each other, positioning the first segment and the second segment into a substantially parallel disposition wherein the male member and the female member are in substantially close proximity, and wherein the lamp means and the support base are in substantially close proximity to afford a folded configuration capable of fitting into a standard shipping carton, packaging the lamp structure device in the folded configuration in a standard shipping carton, shipping a shipment comprising the shipping carton containing the folded lamp structure device, receiving the shipment, unpacking the shipment, inserting the male member into the female member, and, urging the male member and the female member longitudinally together by rotation with respect to each other to the point of abutment and locking, and, for lampposts of polygonal cross-section, to the point that like corners of the tubular lamppost segments of polygonal cross-section are caused to line up with each other.

The present invention is further directed to a kit for shipping a lamp structure device adapted for shipping in a knock-down state, the kit comprising the lamp structure device adapted for shipping in a knock-down state, packaging materials, and at least one instructional device, such as for explaining the assembly of the device printed materials, CD disks, magnetic data storage disks, and videotapes.

According to a feature of the present invention there is provided a connector for tubular lamppost segments.

According to a further feature of the present invention there is provided a novel connector for lampposts wherein the segments may be locked against rotational, longitudinal and transverse movement relative to one another by means of a simple and unexposed locking assembly.

According to still a further feature of the invention there is provided a floor lamp structure that can be stored in a standard shipping container of approximately four feet in a disassembled mode wherein lamppost sections are unassembled when shipped and are then assembled after reaching their destination or later when sold to the purchaser.

According to yet still a further feature of the present invention there is provided a disassembled floor lamp packaged to enable a purchaser to take the lamp at the time of purchase.

According to even a further feature of the present invention there is provided a floor lamp of knockdown character whereby the lamppost is easily assembled without the use of tools by a person of average dexterity.

According to yet even a further feature of the present invention there is provided a floor lamp of knock-down character that is simple in its structure and rugged in construction, as well as relatively inexpensive to manufacture, and yet pleasing in its design.

According to even still a further feature of the present invention there is provided a connector for tubular lamppost segments of polygonal cross-section that is easy to install, and which avoids the use of screws, clips or friction fits which usually require pounding.

According to yet even still a further feature of the present invention there is provided an improved knock-down lamppost joint of polygonal cross-section which, when the connector fittings and the tubes are in their tightly fitting positions, is always fitted snugly together even when made with only modestly stringent manufacturing tolerances.

According to another further feature of the invention, there is provided a knockdown lamppost of the type described wherein the relative rotation of the initially loosely fitting telescoping parts into a joint locking position automatically draws the polygonal tubes involved snugly against each other, so that no unsightly gaps are visible between them, and like corners of the tubular lamppost segments of polygonal cross-section are lined up.

According to still another further feature of the invention, there is provided a knock-down polygonal lamppost joint as described wherein the parts thereof, even after repeated assembly and disassembly thereof, continue to form a secure, tightly fitting joint.

In sum, the above and other objects, features and objectives of the present invention, shall become apparent with the following description whether in conjunction with the accompanying drawings, in which like reference numerical designating indicators designate the same elements.

DETAILED DESCRIPTION OF THE PREFERRED EMBODIMENTS

Definitions

Unless defined otherwise, all technical and scientific terms used herein have the same meaning as is commonly understood by one of skill in the art to which this invention belongs. All patents and publications referred to herein are incorporated by reference.

As used herein, a "lamp" is any device that can produce light.

As used herein, a "polygon" includes regular polygons and polygons that are not regular.

As used herein, the "corners" of a polygon are its vertices.

Figure 1:
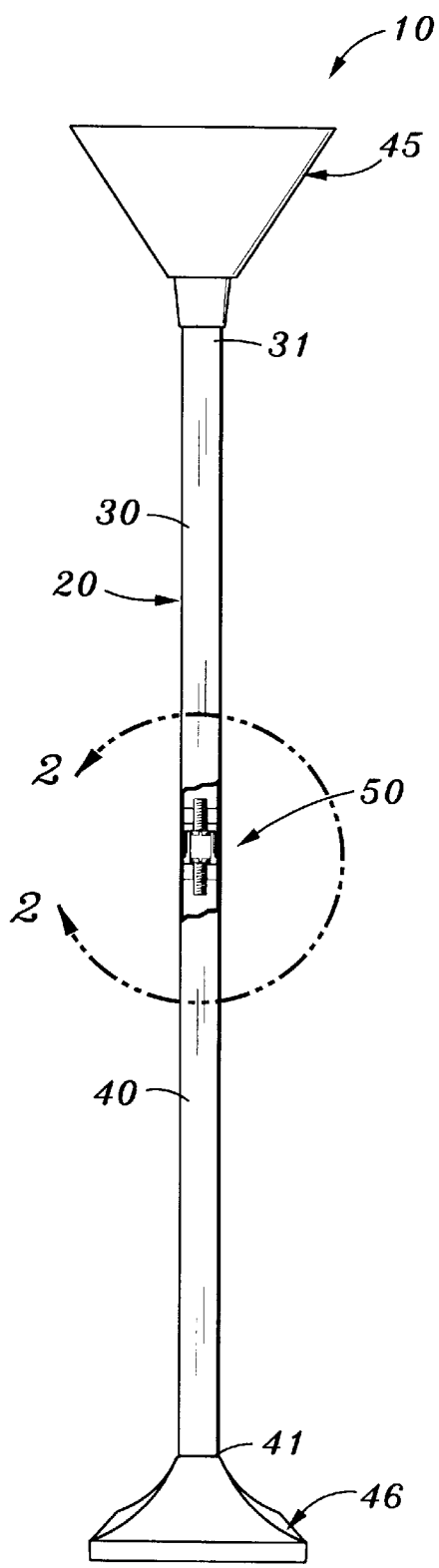
FIG. 1 is a perspective view of an assembled floor lamp comprising two tubular lamppost segments of square cross-section utilizing the present invention.
Figure 2:
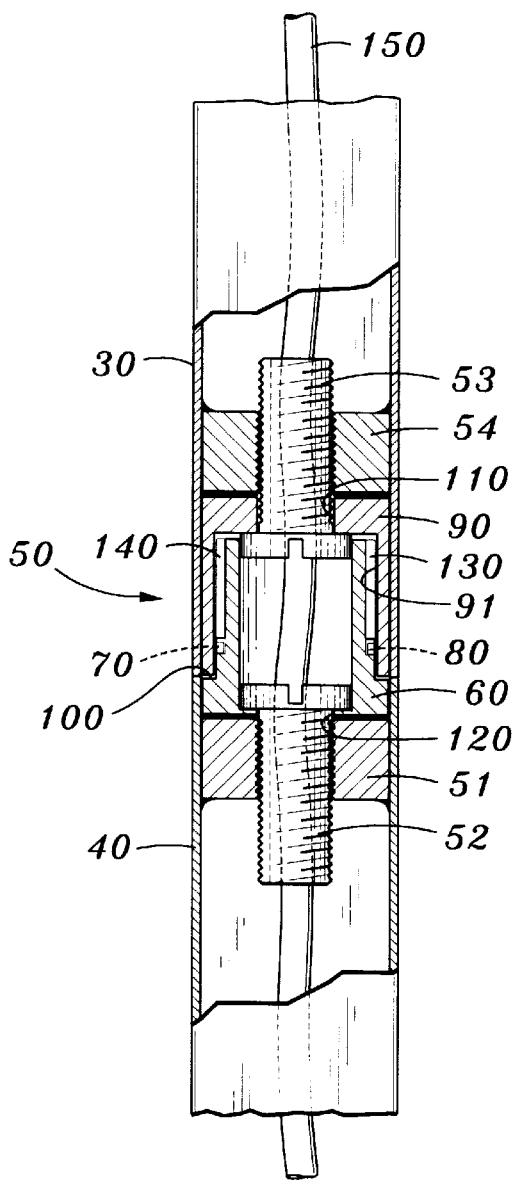
FIG. 2 is an enlarged longitudinal sectional view through the assembled lamppost segments and the inserted connector fitting shown in FIG. 1, taken along section line 2—2 therein.
Figure 3:
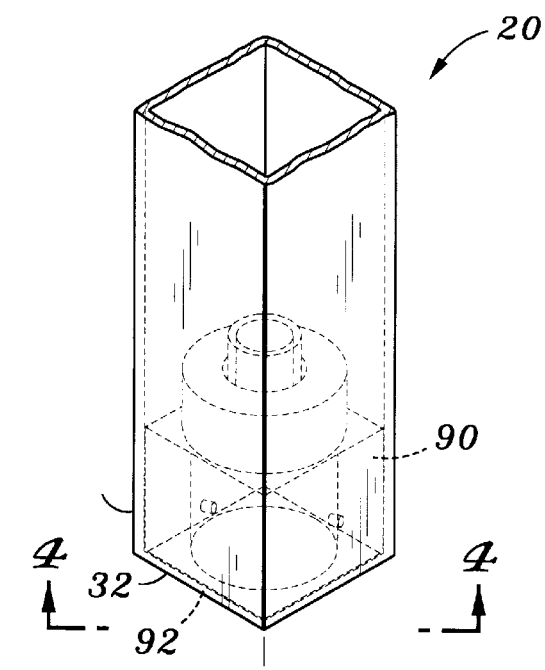
FIG. 3 is an exploded perspective view showing the two lamppost segments separated.
Figure 3:
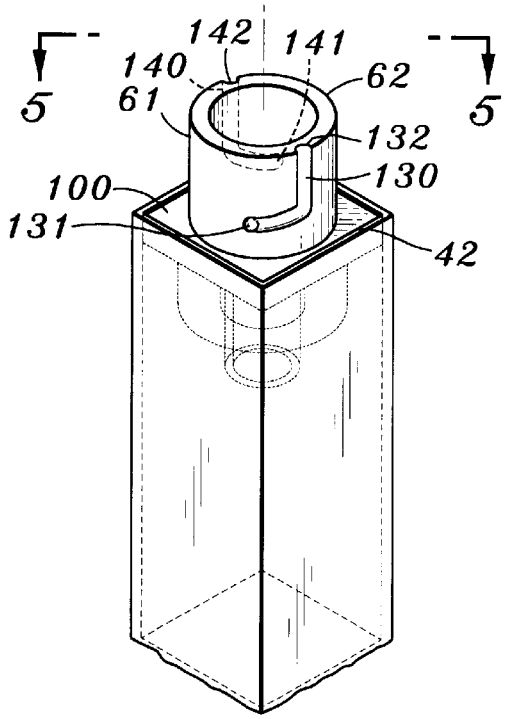
Figure 4:
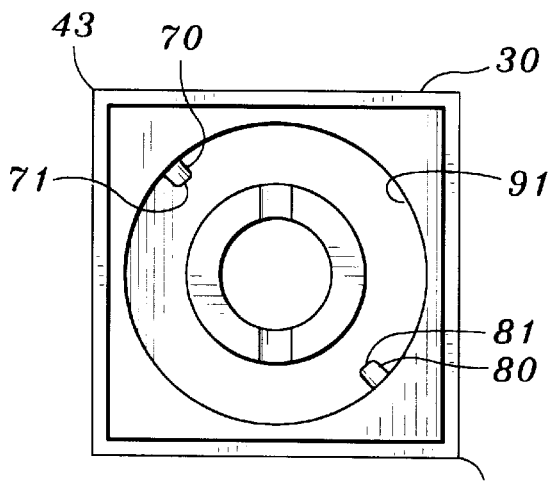
FIG. 4 is a plan view through the assembly of FIG. 3, taken along section 4—4 thereof.
Figure 5:
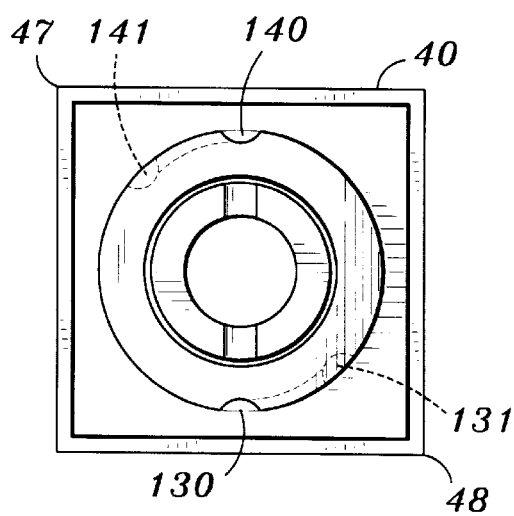
FIG. 5 is a plan view through the assembly of FIG. 3, taken along section 5—5 thereof.

Referring now in more detail to FIGS. 1 through 5, there is shown in combination a floor lamp, generally indicated at 10. Floor lamp 10 comprises an upright tubular lamppost of square cross-section 20 having an upper segment 30 and a lower segment 40. Floor lamp 10 includes a suitable light fixture, such as indicated at 45, which is secured by any suitable means to a first end 31 of segment 30. Floor lamp 10 includes a base 46 on which a first end 41 of lower segment 40 is fixedly secured by any suitable means.

Segment 30 and segment 40 are connected by a connector 50. Connector 50 comprises two members: a hollow cylindrical male member 60 and an elongated female member 90 having a concave surface 91 and a receiving end 92. Member 60 extends longitudinally from a second end 42 of segment 40. Member 60 is threadedly secured to segment 40 by means of a first hollow screw 52 threaded into a first threaded member 51. Member 51 is attached to segment 40 by welding. A first nib 70 and a second nib 80 extend radially in diametrically opposed fashion from surface 91, wherein nib 70 and nib 80 lie in the same plane as a pair of diagonally located vertices, 43 and 44, of the square cross section of segment 30. Member 60 is of such size and shape in external cross-section as to be adapted for operable insertion into member 90. Member 60 extends from an abutment surface 100. A first groove 130 having a substantially semicircular cross section, and a second groove 140 having a substantially semicircular cross section, are inscribed in diametrically opposed positions in an exterior surface 61 of member 60. Proceeding from an open ended origin 132 at a first end 62 of member 60, groove 130 lies parallel to the longitudinal axis of member 40 to form a first arm, and turns to form a second arm resulting in a shape approximating the mirror image of the letter "L." Proceeding from an open ended origin 142 at a first end 62 of member 60, groove 140 lies parallel to the longitudinal axis of member 40 to form a first arm, and turns to form a second arm resulting in a shape approximating the mirror image of the letter "L."

Member 90 is attached within a second end 32 of segment 30 by means of a second hollow screw 53 that is threadedly secured into a second threaded member 54. Member 54 is attached to segment 30 by welding in such a manner that end 92 is flush with end 32. Member 60 includes a passageway 120 intended to be coextensive with the interior of segment 40 for the accommodation of an insulated electrical cord 150. Member 90 includes a passageway 110 intended to be coextensive with the interior of segment 30 for the accommodation of insulated electrical cord 150.

Nib 70 has a tip 71 and nib 80 has a tip 81. Tip 71 serves an engagement and cam function with respect to groove 130 and in this regard is preferably of a substantially rounded shape. Tip 81 serves an engagement and cam function with respect to groove 140 and in this regard is preferably of a substantially rounded shape. Groove 130 is adapted to slidingly receive tip 71 and groove 140 is adapted to slidingly receive tip 81, wherein grooves 130 and 140 are adapted cammingly to urge member 30 and member 40 longitudinally together upon appropriate rotation of member 30 with respect to member 40. Groove 130 is further adapted to terminate in a rounded depression 131 adapted to receive nib 70, wherein depression 131 has shoulders adapted to lockingly restrain nib 70. Groove 140 is further adapted to terminate in a rounded depression 141 adapted to receive nib 80, wherein depression 141 has shoulders adapted to lockingly restrain nib 80. Vertex 48 of segment 40 is caused to line up with vertex 43 of segment 30, and vertex 47 of segment 40 is caused to line up with vertex 44 of segment 30 when members 30 and 40 have been fully urged together to the point of abutment and nib 70 has lockingly entered depression 131 and nib 80 has lockingly entered depression 141. By virtue of these engagement, camming, and locking functions receiving end 92 of member 90 is frictionally locked against abutment surface 100 of member 60, whereby segments 30 and 40 of square cross-section have been joined without gaps, wherein like corners of segments 30 and 40 are lined up. Likewise, for knockdown, grooves 130 and 140 are adapted cammingly to urge member 30 and member 40 longitudinally apart upon appropriate rotation of member 30 with respect to member 40.

On this basis, the instant invention should be recognized as constituting progress in science and the useful arts, as solving the problems in knockdown designs for lamps enumerated above. In the foregoing description, certain terms have been used for brevity, clearness and understanding, but no unnecessary limitation are to be implied therefrom beyond the requirements of the prior art, because such words are used for descriptive purposes herein and are intended to be broadly construed.

Having described preferred embodiments of the invention with reference to the accompanying drawings, it is to be understood that the invention is not limited to those precise embodiments, and that the various changes and modifications may be effected therein by one skilled in the art without departing from the scope or spirit of the invention is defined in the appended claims. For example, the product can have other shapes, or could make use of other metals and plastics. Thus, the scope of the invention should be determined by the appended claims and their legal equivalents, rather than by the examples given.

What is claimed is:

1. A lamp structure device adapted for shipping in a knock-down state comprising in combination:

a lamppost comprising at least two tubular segments longitudinally interconnected by at least one connector, wherein said lamppost has a first free end and a second free end;

a lamp means mounted to said first free end of said lamppost;

a support base means mounted to said second free end of said lamppost; and, said connector, comprising, in combination:

a hollow cylindrical male member having a convex surface adapted for operable insertion into an elongated female member having a concave surface, wherein said male member extends longitudinally from a predetermined end of a first predetermined said tubular segment and is attached thereto by attachment means;

said female member positioned within a predetermined end of a second predetermined said tubular segment, and attached thereto by attachment means;

a passageway for accommodation of an insulated electrical cord within said female member and said male member, wherein said passageway is coextensive with the interior of said predetermined tubular segments to which they are attached;

at least one nib attached to said concave surface of said female member;

a preselected groove adapted to singly receive each said nib, wherein said groove is adapted to slidingly receive said nib;

wherein said groove is located in said convex surface of said male member;

wherein said groove is further adapted to cammingly urge said male member and said female member longitudinally together upon rotation of said male member and said female member with respect to each other; and, wherein said groove is further adapted with means to lockingly restrain said nib after said tubular members are urged together to the point of abutment.

2. A device according to claim 1, wherein said attachment means is selected from the group consisting of welding, press-fitting, gluing, bolting, and soldering.

3. A device according to claim 1, wherein:

said male member is threadedly secured by a first hollow screw threaded into a first threaded member;

said first threaded member is attached to said predetermined end of said first predetermined tubular segment by attachment means selected from the group consisting of welding, press-fitting, gluing, and soldering;

said female member is threadedly secured by a second hollow screw threaded into a second threaded member; and, said second threaded member is attached to said predetermined end of said second predetermined tubular segment by attachment means selected from the group consisting of welding, press-fitting, gluing, and soldering.

4. A device according to claim 2, wherein:

said at least two tubular segments are two said tubular segments;

said at least one connector is one said connector;

said at least one nib is two said nibs, wherein said nibs extend radially in substantially diametrically opposed fashion from said concave surface; and, said at least one groove is two said grooves.

5. A device according to claim 4, wherein:

said tubular segments are of polygonal cross-section; and, said grooves and said nibs are adapted to cammingly urge said male member and said female member longitudinally abuttingly together upon rotation of said male member and said female member with respect to each other, whereby like corners of said tubular lamppost segments of polygonal cross-section are caused to line up with each other.

6. A device according to claim 5, wherein said tubular segments of polygonal cross-section are selected from the group consisting of tubular segments of triangular, square, rectangular, pentagonal, and hexagonal cross-section.

7. A device according to claim 6, wherein said tubular segments of polygonal cross-section are of square cross-section.

8. A lamp structure device adapted for shipping in a knock-down state comprising in combination:

a lamppost comprising two tubular segments of square cross-section longitudinally interconnected by one connector, wherein said lamppost has a first free end and a second free end;

an electric lamp mounted to said first free end of said lamppost;

a support base mounted to said second free end of said lamppost; and, said connector, comprising, in combination:

a hollow cylindrical male member having a convex surface adapted for operable insertion into an elongated female member having a concave surface, wherein said male member extends longitudinally from a predetermined end of a first predetermined said tubular segment; and, wherein:

said male member is threadedly secured by a first hollow screw threaded into a first threaded member;

said first threaded member is attached to said predetermined end of said first predetermined tubular segment by attachment means selected from the group consisting of welding, press-fitting, gluing, and soldering;

said female member is positioned within a predetermined end of a second predetermined said tubular segment, said female member is threadedly secured by a second hollow screw threaded into a second threaded member;

said second threaded member is attached to said predetermined end of said second predetermined tubular segment by attachment means selected from the group consisting of welding, press-fitting, gluing, and soldering;

two nibs are attached to said concave surface of said female member, wherein said nibs extend radially in diametrically opposed fashion from said concave surface;

a passageway for accommodation of an insulated electrical cord is incorporated within said female member and within said male member, wherein said passageway is coextensive with the interior of said two tubular segments of square cross-section to which said female member and said male member are attached;

two grooves exist in said convex surface of said male member, wherein each said groove is adapted to slidingly receive one said nib;

wherein each said groove is further adapted to cammingly urge said male member and said female member longitudinally together upon rotation of said male member and said female member with respect to each other; and, wherein each said groove is further adapted with means to lockingly restrain one said nib after said tubular members are urged together to the point of abutment, whereby like corners of said tubular lamppost segments of square cross-section are caused to line up with each other.

9. A method for knock-down shipping and subsequent reassembly of a lamp structure device according to claim 4, said method comprising the steps of:

(a) urging said male member and said female member longitudinally apart upon rotation of said male member and said female member with respect to each other;

(b) positioning said first predetermined tubular segment and said second predetermined tubular segment into a substantially folded configuration wherein said male member and said female member are in substantially close proximity, and wherein said lamp means and said support base are in substantially close proximity, to afford a substantially folded lamp structure device capable of fitting into a standard shipping carton;

(c) packaging said substantially folded lamp structure device in a standard shipping carton;

(d) shipping a shipment comprising said shipping carton containing said substantially folded lamp structure device;

(e) receiving said shipment;

(f) unpacking said shipment;

(g) unfolding said substantially folded lamp structure device;

(h) inserting said male member into said female member; and, (i) urging said male member and said female member longitudinally together by rotation of said male member and said female member with respect to each other to the point of abutment and locking.

10. A method for knock-down shipping and subsequent reassembly of a lamp structure device according to claim 5, said method comprising the steps of:

(a) urging said male member and said female member longitudinally apart upon rotation of said male member and said female member with respect to each other;

(b) positioning said first predetermined tubular segment and said second predetermined tubular segment into a substantially folded configuration wherein said male member and said female member are in substantially close proximity, and wherein said lamp means and said support base are in substantially close proximity, to afford a substantially folded lamp structure device capable of fitting into a standard shipping carton;

(c) packaging said substantially folded lamp structure device in a standard shipping carton;

(d) shipping a shipment comprising said shipping carton containing said substantially folded lamp structure device;

(e) receiving said shipment;

(f) unpacking said shipment;

(g) unfolding said substantially folded lamp structure device;

(h) inserting said male member into said female member; and, (i) urging said male member and said female member longitudinally together by rotation of said male member and said female member with respect to each other to the point of abutment and locking whereby like corners of said first and second tubular lamppost segments of polygonal cross-section are caused to line up with each other.

11. A method for knock-down shipping and subsequent reassembly of a lamp structure device adapted for shipping in a knock-down state, said device comprising in combination:

a lamppost comprising two tubular segments of square cross-section longitudinally interconnected by one connector, wherein said lamppost has a first free end and a second free end;

an electric lamp mounted to said first free end of said lamppost;

a support base mounted to said second free end of said lamppost; and, said connector, comprising, in combination:

a hollow cylindrical male member having a convex surface adapted for operable insertion into an elongated female member having a concave surface, wherein said male member extends longitudinally from a predetermined end of a first predetermined said tubular segment; and, wherein:

said male member is threadedly secured by a first hollow screw threaded into a first threaded member;

said first threaded member is attached to said predetermined end of said first predetermined tubular segment by attachment means selected from the group consisting of welding, press-fitting, gluing, and soldering;

said female member is positioned within a predetermined end of a second predetermined said tubular segment, said female member is threadedly secured by a second hollow screw threaded into a second threaded member;

said second threaded member is attached to said predetermined end of said second predetermined tubular segment by attachment means selected from the group consisting of welding, press-fitting, gluing, and soldering;

two nibs are attached to said concave surface of said female member, wherein said nibs extend radially in diametrically opposed fashion from said concave surface;

a passageway for accommodation of an insulated electrical cord is incorporated within said female member and within said male member, wherein said passageway is coextensive with the interior of said two tubular segments of square cross-section to which said female member and said male member are attached;

two grooves exist in said convex surface of said male member, wherein each said groove is adapted to slidingly receive one said nib;

wherein each said groove is further adapted to cammingly urge said male member and said female member longitudinally together upon rotation of said male member and said female member with respect to each other; and, wherein each said groove is further adapted with means to lockingly restrain one said nib after said tubular members are urged together to the point of abutment, whereby like corners of said tubular lamppost segments of square cross-section are caused to line up with each other;

said method comprising the steps of:

(a) urging said male member and said female member longitudinally apart upon rotation of said male member and said female member with respect to each other;

(b) positioning said first segment and said second segment into a substantially folded configuration wherein said male member and said female member are in substantially close proximity, and wherein said lamp means and said support base are in substantially close proximity, to afford a substantially folded lamp structure device capable of fitting into a standard shipping carton;

(c) packaging said substantially folded lamp structure device in a standard shipping carton;

(d) shipping a shipment comprising said shipping carton containing said substantially folded lamp structure device;

(e) receiving said shipment;

(f) unpacking said shipment;

(g) unfolding said substantially folded lamp structure device;

(h) inserting said male member into said female member; and, (i) urging said male member and said female member longitudinally together by rotation of said male member and said female member with respect to each other to the point of abutment and locking whereby like corners of said tubular lamppost segments of square cross-section are caused to line up with each other.

12. A kit for shipping a lamp structure device adapted for shipping in a knock-down state, said kit comprising:

(a) the device of claim 1;

(b) packaging materials; and, (c) at least one instructional device for explaining the assembly of said device.

13. A kit according to claim 12, wherein said instructional device includes at least one device selected from the group consisting of printed materials, CD disks, magnetic data storage disks, and videotapes.

14. A kit for shipping a lamp structure device adapted for shipping in a knock-down state, said kit comprising:

(a) the device of claim 5;

(b) packaging materials; and, (c) at least one instructional device for explaining the assembly of said device.

15. A kit according to claim 12, wherein said instructional device includes at least one device selected from the group consisting of printed materials, CD disks, magnetic data storage disks, and videotapes.

16. A kit for shipping a lamp structure device adapted for shipping in a knock-down state, said kit comprising:

(a) the device of claim 8;

(b) packaging materials; and, (c) at least one instructional device for explaining the assembly of said device.

17. A kit according to claim 16, wherein said instructional device includes at least one device selected from the group consisting of printed materials, CD disks, magnetic data storage disks, and videotapes.

* * * * *